E. D. SHAFFER.
FREIGHT CARS.

No. 183,334. Patented Oct. 17, 1876.

WITNESSES:
C. Neveux
John Goethals

INVENTOR:
E. D. Shaffer
BY
ATTORNEYS.

UNITED STATES PATENT OFFICE.

EDWARD D. SHAFFER, OF MONCTON, NEW BRUNSWICK, CANADA.

IMPROVEMENT IN FREIGHT-CARS.

Specification forming part of Letters Patent No. 183,334, dated October 17, 1876; application filed May 16, 1876.

*To all whom it may concern:*

Be it known that I, EDWARD D. SHAFFER, of Moncton, in the Province of New Brunswick, Dominion of Canada, have invented a new and Improved Freight-Car, of which the following is a specification:

The object of my invention is to provide a car adapted for grain and other freight, which can be loaded and unloaded by chutes, and also adapted for rolling freight, either of which may be carried alone or both together.

The invention consists in the arrangement of a vertical partition dividing the car into two parts, openings in the top and bottom of the car for admitting and discharging grain, and inclined partitions, forming, with said vertical partition, two hoppers or receptacles for the grain to be transported, as hereinafter described.

Figure 1:
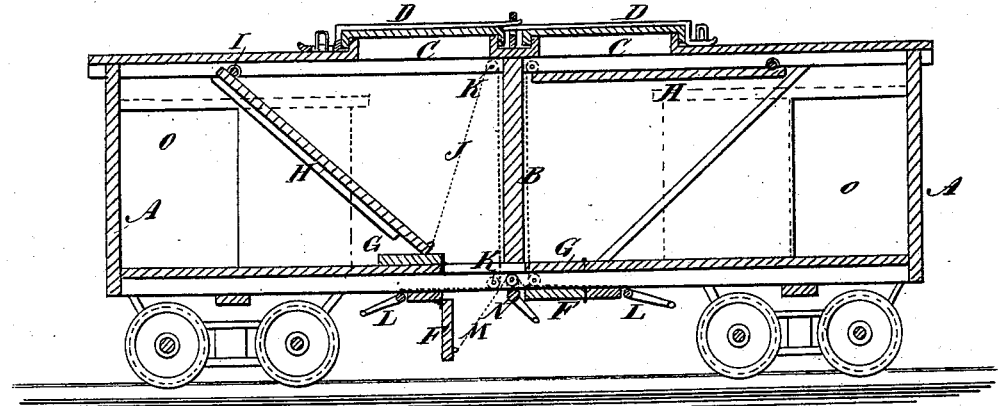
Figure 2:
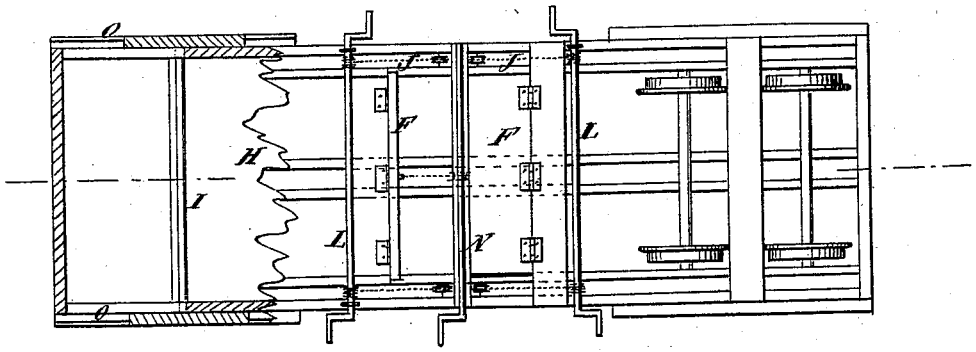
Figure 4:
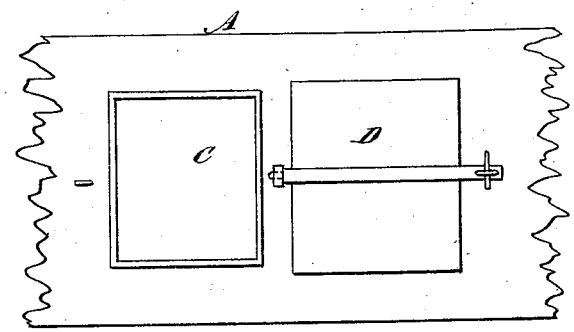
Figure 3:
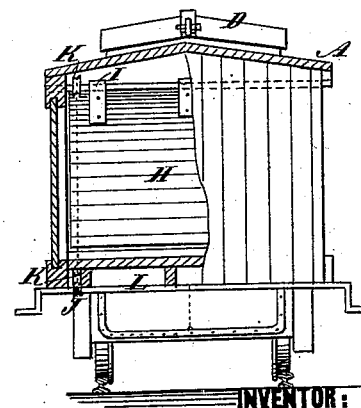

In the accompanying drawing, Figure 1 is a longitudinal sectional elevation of my improved car, taken on line $x\ x$. Fig. 2 is a horizontal section. Fig. 3 is a transverse section, and Fig. 4 is a plan of a portion of the top.

In the accompanying diagram, A is the body of the car, which may be of any construction, and has a transverse partition at B, also openings C through the top, with hatch-covers D; also openings in the bottoms, with doors F to close them from below, and doors G to close them from above; and in each compartment is a hopper-bottom, H, to hold the grain and other like freight, so as to flow out at the bottom opening, the said bottom H being hinged to the car-body at I, or thereabout, and having cords or chains J attached to the lower end, and passing over pulleys K to crank-shaft L under the car, for raising them up to the top out of the way when rolling freight is to be carried. The doors F, which close the bottom openings from the under side, are also connected by cords or chains M with a crank-shaft, N, for closing them. The side doors O for the rolling freight are located near each end of the car, so that such freight may be loaded in under the grain-hoppers and carried at the same time.

The partition is employed for carrying grain in one compartment and rolling reight in the other. The doors G are employed to fill the openings and level the floor when rolling freight is to be carried. They may be swung back under the hoppers when grain is to be carried.

Having thus described my invention, what I claim as new, and desire to secure by Letters Patent, is—

A freight-car divided by partition B, having inclines H H, and provided with top openings C and bottom openings, outside covers D F, and inside door G, all arranged substantially as and for the purpose specified.

EDWARD D. SHAFFER.

Witnesses:
THOMAS WASSON,
JOHN P. MCALLAN.